United States Patent [19]

Voetz

[11] 4,344,797
[45] Aug. 17, 1982

[54] SHAPED ARTICLES MADE FROM EXPANDED MINERALS

[75] Inventor: Franz J. Voetz, Camberg, Fed. Rep. of Germany

[73] Assignee: Hoechst Aktiengesellschaft, Fed. Rep. of Germany

[21] Appl. No.: 237,708

[22] Filed: Feb. 24, 1981

[30] Foreign Application Priority Data

Feb. 29, 1980 [DE] Fed. Rep. of Germany ....... 3007738

[51] Int. Cl.³ .............................. C04B 19/04
[52] U.S. Cl. ........................ 106/84; 106/308 Q; 106/308 N; 106/308 F
[58] Field of Search .............. 106/84, 288 B, 308 F, 106/308 Q, 308 N, DIG. 2

[56] References Cited

U.S. PATENT DOCUMENTS 3,718,491  2/1973  Yates ........................... 106/DIG. 2
3,933,514  1/1976  Banks et al. ..................... 106/84

FOREIGN PATENT DOCUMENTS 592793  2/1978  U.S.S.R. ...................... 106/DIG. 2

*Primary Examiner*—James Poer
*Attorney, Agent, or Firm*—Connolly and Hutz

[57] ABSTRACT

Shaped articles made from expanded minerals, obtained by solidification of a mixture of water glass, catalyst and an expanded mineral pretreated with a hydrophobizing agent which comprises substantially (a) a fatty amine of the formula

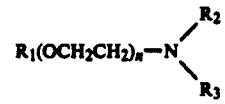

in which $R_1$ is $C_8-C_{22}$, preferably $C_{14}-C_{22}$-alkyl or -alkenyl, or $C_8-C_{22}$-alkylphenyl, $R_2$ and $R_3$ each are hydrogen, $C_1-C_4$-alkyl or -alkenyl, phenyl or benzyl, and n is a number of from 0 to 4:

(b) a fatty acid of the formula $$R_5CO(OCH_2CH_2)_mOH$$

or a fatty alcohol of the formula $$R_6(OCH_2CH_2)_mOH$$

in which formulae $R_5$ is $C_8-C_{22}$, preferably $C_{14}-C_{22}$-alkyl or -alkenyl, $R_6$ is $C_9-C_{23}$, preferably $C_{15}-C_{23}$-alkyl or -alkenyl, and m is a number of from 0 to 2; and (c) a low molecular weight acid.

3 Claims, No Drawings

SHAPED ARTICLES MADE FROM EXPANDED MINERALS

The use of loose packings of expanded minerals such as Perlite and Vermiculite as insulating material in cavity ceilings and double-shell masonry is a practice known for long years. However, when such ceilings or walls must be opened, the whole packing rushes out of the opening. In order to avoid this disadvantage, attempts have been made to solidify expanded minerals by bitumen, melamine formol, or phenolformol resins. However, these materials are either flammable or have to be used in such an elevated concentration that their application becomes uneconomic. It has now been found that the solidification of expanded minerals in order to obtain shaped articles can be improved when they are previously hydrophobized by means of a fatty amine.

Subject of the invention are shaped articles made from expanded minerals, obtained by solidification of a mixture of water glass, catalyst and an expanded mineral pretreated with a hydrophobizing agent which comprises substantially (a) a fatty amine of the formula

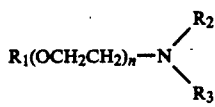

in which $R_1$ is $C_8-C_{22}$, preferably $C_{14}-C_{22}$-alkyl or -alkenyl, or $C_8-C_{22}$-alkylphenyl, $R_2$ and $R_3$ each are hydrogen, $C_1-C_4$-alkyl or -alkenyl, phenyl or benzyl, and n is a number of from 0 to 4;

(b) a fatty acid of the formula

or a fatty alcohol of the formula

in which formulae $R_5$ is $C_8-C_{22}$, preferably $C_{14}-C_{22}$-alkyl or -alkenyl, $R_6$ is $C_9-C_{23}$, preferably $C_{15}-C_{23}$-alkyl or -alkenyl, and m is a number of from 0 to 2; and (c) a low molecular weight acid.

Suitable fatty acids (b) for the hydrophobizing agent are above all saturated and unsaturated fatty acids and mixtures thereof, such as they are obtained on saponification of natural fats, for example tallow fatty acid, coconut fatty acid, stearic, oleic or palmitic acid. This is valid, mutatis mutandis, also for the fatty alcohols (b) and the fatty amines (a). The low molecular weight acids (c) are essentially $C_1-C_4$-carboxylic acids such as formic or acetic acid, dicarboxylic acids such as oxalic or malonic acid, hydroxycarboxylic acids such as lactic acid, furthermore monovalent inorganic acids such as hydrochloric or nitric acid, but also amidosulfonic acid. The molar mixing ratio of the individual components (a), (b) and (c) may vary within wide limits, and is in the range of from 10:1:1 via 1:1:10 to 1:10:1. A sufficient hydrophobizing effect is attained already when omitting the fatty acid or fatty alcohol (b) completely; the molar mixing ratio of components (a) and (c) being then in the range of from 10:1 to 1:10. The components (a) to (c) of this hydrophobizing agent are melted together, the mixture is applied onto the expanded minerals in the form of a 2 to 10, preferably 4 to 7, % aqueous dispersion, and subsequently dried. Alternatively, the hydrophobizing agent may be applied onto the mineral immediately after the expanding operation, so that a separate drying can be renounced.

The mineral so hydrophobized is mixed for about 2 to 10 minutes with water glass and a catalyst, and subsequently introduced into a corresponding mold, where the mixture of solidified under pressure. After 5 to 30 minutes, the shaped articles are removed from the mold, and finally dried in order to eliminate the water, either by standing at room temperature or, in the case where a rapid drying is intended, by heating for 5 minutes to, for example, 120°-150° C.

As water glass, those products may be employed in which the weight ratio of $SiO_2$ and $Na_2O$ is in the range of from 4.5:1 to 2.5:1, preferably 3.9:1 to 3.1:1, or that of $SiO_2$ to $K_2O$ is in the range of from 2.8:1 to 1.5:1, preferably 2.3:1 to 1.9:1, corresponding to 30-60 Bé°.

As catalysts, there are used acid-forming agents which by reaction with the alkali metal silicate in the water glass precipitate free silicic acid, such as alkali metal- or ammonium hydrogenocarbonates or -hydrogenosulfates, preferably sodium hydrogencarbonate or sodium hydrogenosulfate, or carboxylic acid alkyl esters each having from 2 to 14, preferably 4 to 12, carbon atoms in the alkyl and carboxylic acid moiety. Especially preferred is glyoxal, because it is hydrosoluble, flame-repellent, insignificantly toxic and controllable with respect to its reaction time. In order to obtain sufficient solidification of the shaped articles, such an amount of water glass is used that the amount of alkali metal silicate is from 5 to 15 weight %, relative to the mineral. The required amount of catalyst is from 0.1 to 4 weight %, also relative to the mineral. In order to obtain a good distribution, the water glass and the catalyst are diluted with the 1- to 5-fold amount of water prior to mixing with the mineral. The hydrophobized mineral is mixed for about 2 to 10 minutes with the water glass and the catalyst in an appropriate mixing device.

The mixture of expanded, hydrophobized mineral, water glass and catalyst can be solidified to yield any kind of shaped articles, for example plates which can be applied either alone or with plaster boards as heat and sound insulating ceiling or wall panels. When using corresponding molds, hollow articles can be manufactured which are suitable as leakage-preventing packaging material or as planting pots which due to their open-pore structure allow fertilizer or pesticide depots to be incorporated into their pores. By means of cubic and cylindric molds, pieces can be manufactured which serve for ensuring recesses etc. for installation equipment in concrete ceilings, floors and precast concrete units. Pantiles and cement-bonded roofing and facing plates can be coated with the above mixture, thus giving them an insulating layer.

The following examples illustrate the invention.

EXAMPLE 1

100 g of hydrophobized Vermiculite were mixed for 5 minutes in a kitchen mixer with 50 or 100 g each of one of the three mixtures of water glass, catalyst and glyoxal as indicated below. The mixture was filled into a Proctor mold having an internal diameter of 10 cm, and levelled. A metal plate was placed above, and a drop weight of 2.5 kg was allowed to drop 10 times from a height of 30 cm, in order to compress the shaped article.

The Vermiculite contained 0.7 weight % (Vermiculite I), 1 weight % (Vermiculite II) and 1.5 weight % (Vermiculite III) of a hydrophobizing agent composed as follows:

| | | |
|---|---|---|
| 29.2% | stearylamine | |
| 16.7% | tallow fatty acid | |
| 3.4% | acetic acid | |
| 20% | isopropanol | |
| 30% | deionized water | |

| water glass mixture | 1 | 2 | 3 |
|---|---|---|---|
| sodium silicate 35–37 Bé° | 100 g | 100 g | 100 g |
| water | 200 g | 300 g | 200 g |
| glyoxal 40% | 10 g | 10 g | 20 g |

Results:

| | | | | | | | | |
|---|---|---|---|---|---|---|---|---|
| Vermiculite I | 100 g | 100 g | | | | | | |
| Vermiculite II | | | 100 g | 100 g | | | 100 g | 100 g |
| Vermiculite III | | | | | 100 g | 100 g | | |
| water glass mixture 1 | 50 g | 100 g | 50 g | 100 g | 50 g | 100 g | | |
| mixture 2 | | | | | | | 50 g | |
| mixture 3 | | | | | | | | 50 g |
| unit weight of the articles g/l | 195 | 195 | 250 | 250 | 240 | 260 | 210 | 230 |
| strength | good | good | very good | very good | good | very good | good | good |

EXAMPLE 2

100 g of hydrophobized Perlite were mixed for 5 minutes in a kitchen mixer with 50 g or 100 g each of one of the mixtures of water glass, catalyst and glyoxal as indicated below. The mixture was filled into a Proctor mold having an internal diameter of 10 cm, and levelled. A metal plate was placed above, and a drop weight of 2.5 kg was placed above, and a drop weight of 2.5 kg was allowed to drop 10 times from a height of 30 cm, in order to compress the shaped article.

The Perlite contained 0.5 weight % (Perlite I), 1 weight % (Perlite II), and 1.5 weight % (Perlite III) of a hydrophobizing agent composed as follows:

| | | |
|---|---|---|
| 45% | stearylamine | |
| 2.5% | formic acid | |
| 2.5% | stearic acid | |
| 20% | isopropanol | |
| 30% | deionized water | |

| water glass mixture | 1 | 2 | 3 |
|---|---|---|---|
| sodium silicate 35–37 Bé° | 100 g | 100 g | 100 g |
| water | 200 g | 300 g | 200 g |
| glyoxal 35% | 10 g | 10 g | 20 g |

| | | | | | | | | |
|---|---|---|---|---|---|---|---|---|
| Perlite I | 100 g | 100 g | 100 g | | | | | |
| Perlite II | | | | 100 g | 100 g | 100 g | | |
| Perlite III | | | | | | | 100 g | 100 g |
| water glass mixture 1 | 50 g | | | 50 g | | | 50 g | |
| mixture 2 | | 50 g | | | 50 g | | | 50 g |
| mixture 3 | | | 50 g | | | 50 g | | |
| unit weight of the articles g/l | 340 | 280 | 230 | 280 | 250 | 230 | 250 | 230 |
| strength | good | very good | very good | excellent | very good | very good | very good | very good |

What is claimed is:

1. Shaped articles made from expanded minerals, obtained by solidification of a mixture of water glass, catalyst and an expanded mineral pretreated with a hydrophobizing agent which comprises substantially (a) a fatty amine of the formula

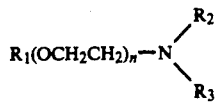

in which $R_1$ is $C_8$–$C_{22}$alkyl or -alkenyl, or $C_8$–$C_{22}$-alkylphenyl, $R_2$ and $R_3$ each are hydrogen, $C_1$–$C_4$-alkyl or -alkenyl, phenyl or benzyl, and n is a number of from 0 to 4;

(b) a fatty acid of the formula

or a fatty alcohol of the formula

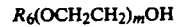

in which formulae $R_5$ is $C_8$–$C_{22}$alkyl or -alkenyl, $R_6$ is $C_9$–$C_{23}$alkyl or -alkenyl, and m is a number of from 0 to 2; and (c) a low molecular weight acid, said components (a), (b) and (c) being combined within the following range of molar mixing ratios:

from 1 to 10 moles of component (a) for each 1 to 10 moles of component (c) and 0 to 10 moles of component (b).

2. Shaped articles according to claim 1, wherein said hydrophobizing agent comprises (a) a $C_8$–$C_{22}$ alkylamine or alkenylamine, (b) a saturated or unsaturated $C_8$–$C_{22}$ fatty acid or $C_9$–$C_{23}$ fatty alcohol, and (c) a low molecular weight acid selected from the group consisting of $C_1$–$C_4$ carboxylic or dicarboxylic or hydroxycarboxylic acids and monovalent inorganic acids, said components (a), (b) and (c) being combined in a molar ratio of (a):(b):(c) within the range of 1 to 10:0 to 10.

3. Shaped articles according to claim 2 wherein the hydrophobizing agent consists essentially of:

(a) a $C_{14}$–$C_{22}$ alkylamine or alkenyl amine, (b) a $C_{15}$–$C_{23}$ fatty alcohol, and (c) a $C_1$–$C_4$ monocarboxylic acid.

* * * * *